United States Patent
Corr et al.

(10) Patent No.: US 6,384,095 B1
(45) Date of Patent: May 7, 2002

(54) CLOSED CELL POLYMER FOAM

(75) Inventors: Stuart Corr, Cheshire; Peter J Smith, Lancashire; Bernard J Cross, Cleveland, all of (GB)

(73) Assignee: Imperial Chemical Industries PLC, London (GB)

(*) Notice: Subject to any disclaimer, the term of this patent is extended or adjusted under 35 U.S.C. 154(b) by 0 days.

(21) Appl. No.: 09/341,922

(22) PCT Filed: Jan. 16, 1998

(86) PCT No.: PCT/GB98/00144
§ 371 Date: Oct. 1, 1999
§ 102(e) Date: Oct. 1, 1999

(87) PCT Pub. No.: WO98/32787
PCT Pub. Date: Jul. 30, 1998

(30) Foreign Application Priority Data

Jan. 22, 1997 (GB) ............................................. 9701291

(51) Int. Cl.⁷ .................................................. C08J 9/14
(52) U.S. Cl. ............................ 521/81; 521/79; 521/97; 521/98
(58) Field of Search ............................... 521/79, 81, 97, 521/98

(56) References Cited

U.S. PATENT DOCUMENTS

| | | | | |
|---|---|---|---|---|
| 4,422,877 A | * | 12/1983 | Spitzer | 521/79 |
| 5,221,492 A | * | 6/1993 | Bartlett | 521/131 |
| 5,244,928 A | * | 9/1993 | Smith et al. | 521/79 |
| 5,254,400 A | * | 10/1993 | Bonner, Jr. et al. | 521/131 |
| 5,254,596 A | * | 10/1993 | Irick et al. | 521/131 |
| 5,340,846 A | * | 8/1994 | Rotter et al. | 521/28 |
| 5,674,916 A | * | 10/1997 | Schmidt et al. | 521/79 |
| 5,679,718 A | * | 10/1997 | Suh et al. | 521/913 |
| 5,817,705 A | * | 10/1998 | Wilkes et al. | 521/79 |
| 5,830,924 A | * | 11/1998 | Suh et al. | 521/79 |
| 5,925,612 A | * | 7/1999 | Lund et al. | 521/131 |
| 5,993,707 A | * | 11/1999 | Chaudhary et al. | 521/79 |
| 6,093,752 A | * | 7/2000 | Park et al. | 521/134 |
| 6,096,793 A | * | 8/2000 | Lee et al. | 521/134 |
| 6,225,364 B1 | * | 5/2001 | Chaudhary et al. | 521/82 |

FOREIGN PATENT DOCUMENTS

| | | |
|---|---|---|
| EP | 427 533 | 5/1991 |
| EP | 445 847 | 9/1991 |
| WO | 93/14923 | 8/1993 |
| WO | 96/16111 | 5/1996 |
| WO | 96/34038 | 10/1996 |

OTHER PUBLICATIONS

Database WPI Section Ch, Week 9102 Derwent Publication Ltd., London, GB; Class A13, AN 91–011581 XP00262783 & JP 02 284 933 A (Sekisui Plastics Co Ltd.), Nov. 22, 1990.

* cited by examiner

*Primary Examiner*—Morton Foelak
(74) *Attorney, Agent, or Firm*—Pillsbury Winthrop LLP

(57) ABSTRACT

A closed-cell polymer foam having a density of less than 100 kg.m$^{-3}$ is described. The cells in the foam contain a foam blowing agent comprising (a) a blend of two or more hydrofluorocarbons, (b) a blend comprising a carbon dioxide and one or more hydrofluorocarbons or (c) a blend comprising dimethyl ether and one or more hydrofluorocarbons, and the polymer is a blend comprising at least 50% by weight of an olefinic polymer(s) and up to 50% by weight of a polar polymer(s) having a lower molecular weight than the olefinic polymer which when in the heat plasticised state is able to dissolve the foam blowing agent. A process for preparing the foam is also described.

23 Claims, No Drawings

CLOSED CELL POLYMER FOAM

This application is the national phase of international application PCT /GB98 /00144 filed Jan. 16, 1998 which designated the U.S.

The present invention relates to a closed-cell polymer foam in which the polymer comprises a blend of an olefinic, particularly a styrenic polymer and a polar polymer having a lower molecular weight than the olefinic polymer. The present invention also relates to a process for preparing such a polymer foam and to foamed articles made from the foam.

Closed-cell polystyrene foams are widely used and, in particular, find utility as an insulating material. The good insulation performance of such foams is largely associated with their fine cellular structure and the gaseous material, typically a fully halogenated chlorofluorocarbon or hydrochlorofluorocarbon, which fills the cells or bubbles within the foam.

It is well known that polystyrene foam may be readily formed by an extrusion process. Such a process is described, for example, in GB-2146941 and in EP-0411923 which is concerned with the preparation of polystyrene foam having a density of from 32 to 160 $kg.m^{-3}$ using an extrusion process in which liquid carbon dioxide is employed as a blowing agent.

In a typical extrusion process, a blowing agent, which may be in the liquid or gaseous state, is injected under pressure into a stream of heat plasticised/heat softened polymer flowing through an extruder. Significant quantities of the blowing agent dissolve in the heat plasticised polymer resulting in the formation of a mobile, low viscosity mixture which is then pumped to an extrusion die under high pressure. As the mixture approaches the die, the pressure acting on the mixture drops causing dissolved blowing agent to come out of solution to form bubbles. The mixture then passes through the die and emerges from the extruder on the other side of the die where the pressure acting on the mixture drops still further to atmospheric pressure resulting in the further release of dissolved blowing agent and an increase in the volume of the bubbles that have formed. The viscosity of the polymer and the surface tension at the polymer/bubble interface influence the size of the bubbles that form from the evolution of the dissolved blowing agent. A low viscosity polymer provides for rapid bubble growth, but if too low allows the blowing agent to escape into the atmosphere before the polymeric foam has had time to set. During the extrusion process the temperature/pressure profile along the extruder is adjusted so as to control the release of the dissolved blowing agent from the polymer and the rate at which the polymer cools. In this way, the volume of the bubbles that form during the extrusion process can be controlled so as to obtain foam of the required density. A nucleating agent can also be added to the polymer in order to control the number and distribution of the bubbles that form in the blowing process.

Hitherto, polymer foams have typically been prepared using fully halogenated chlorofluorocarbon and hydrochlorofluorocarbon blowing agents. However, such materials and particularly fully halogenated chlorofluorocarbons have been implicated in the destruction of the earth's protective ozone layer so that a need has arisen to find alternative blowing agents. Fully halogenated chlorofluorocarbons and hydrochlorofluorocarbons have also been widely used as refrigerants and in respect of this particular application replacement refrigerants comprising one or more ozone benign hydrofluorocarbons have been developed. Unfortunately, however, the different solubility characteristics of hydrofluorocarbons mean that the heat plasticised/heat softened polystyrene formed in the extrusion process is unable to dissolve sufficient of a hydrofluorocarbon blowing agent to allow for the preparation of a suitable polystyrene foam. More specifically, the relatively low solubility of the hydrofluorocarbon in the heat plasticised/heat softened polystyrene phase will result in the formation of a hydrofluorocarbon/polystyrene mixture having a higher viscosity than is normal for blowing agent/polystyrene mixtures in extrusion processes and this will act to increase the extruder power requirement. Furthermore, the low solubility of the hydrofluorocarbon limits the availability of blowing agent in the mixture and this can tend to result in an unacceptable increase in foam density.

Therefore, there is a need to prepare polystyrene and other polyolefin foams of acceptable quality and performance using blowing agents which have low and preferably zero ozone depletion potentials.

The present invention provides for the use of hydrofluorocarbon containing blowing agents which have no deleterious effect on the ozone layer in the preparation of polystyrene based foams. This is achieved by incorporating a minor amount of a polar auxiliary polymer in the polystyrene which is able to dissolve significant quantities of a hydrofluorocarbon containing blowing agent when in the heat plasticised/heat softened state. The resulting polymer blend is able to dissolve greater quantities of a hydrofluorocarbon containing blowing agent when in the heat plasticised/heat softened state than polystyrene alone. Additional benefits may also include the reduced emission of gaseous blowing agents to the environment and the ability to prepare foams without the need for the inclusion of fire retardants or plasticisers within the foam. The present invention may also find utility in the preparation of other polyolefin foams.

According to a first aspect of the present invention there is provided a closed-cell polymer foam having a density of less than 100 $kg.m^{-3}$, preferably in the range of from 20 to 80 $kg.m^{-3}$, in which the cells contain a foam blowing agent comprising:

(a) a blend of two or more hydrofluorocarbons, (b) a blend comprising carbon dioxide and one or more hydrofluorocarbons, or (c) a blend comprising dimethyl ether and one or more hydrofluorocarbons, and the polymer is a blend comprising at least 50% by weight of an olefinic polymer(s) and up to 50% by weight of a polar polymer(s) having a lower molecular weight than the olefinic polymer which when in the heat plasticised state is able to dissolve the foam blowing agent.

In a preferred embodiment, the closed-cell polymer foam is a closed-cell thermoplastic polymer foam.

The closed-cell polymer foam of the invention is prepared from a foam blowing agent comprising (a) a blend of two or more hydrofluorocarbons, (b) a blend comprising carbon dioxide and one or more hydrofluorocarbons or (c) a blend comprising dimethyl ether and one or more hydrofluorocarbons and a polymer composition comprising at least 50%, e.g. from 50 to 99%, by weight of an olefinic polymer(s) and up to 50%, e.g. from 1 to 50%, by weight of a polar polymer(s) having a lower molecular weight than the olefinic polymer which when in the heat plasticised state is able to dissolve the foam blowing agent. A proportion of the foam blowing agent which is used in the preparation of the foam is encapsulated by the cells or bubbles which form during the blowing process so that the closed-cell polymer foam which is finally prepared retains a proportion of the gaseous blowing agent used in its preparation. The closed-cell polymer foam of the invention is conveniently prepared using conventional extrusion techniques of the type which are routinely employed in the preparation of polystyrene foams.

According to a second aspect of the present invention there is provided a process for preparing a closed-cell polymer foam as defined in the first aspect which comprises blowing a heat plasticised polymer composition with a foam blowing agent comprising:

(a) a blend of two or more hydrofluorocarbons, (b) a blend comprising carbon dioxide and one or more hydrofluorocarbons, or (c) a blend comprising dimethyl ether and one or more hydrofluorocarbons, the said polymer composition comprising at least 50% by weight of an olefinic polymer(s) and up to 50% by weight of a polar polymer(s) having a lower molecular weight than the olefinic polymer which when in the heat plasticised state is able to dissolve the foam blowing agent.

In the process of the present invention the heat plasticised/heat softened polymer composition is contacted with the foam blowing agent under elevated temperature and pressure conditions and at least a proportion of the foam blowing agent dissolves in the polymer composition to form a mobile mixture. Typically, the foam blowing agent is injected into the heat plasticised polymer composition. Elevated temperatures and pressures in the range of from 100 to 300° C., e.g. 120 to 300° C., and 20 to 200 bar, e.g. 50 to 200 bar, respectively are typically employed at the point at which the heat plasticised polymer composition is contacted with the foam blowing agent. Preferably temperatures in the range of from 120 to 180° C. and pressures in the range of from 50 to 150 bar are employed. The pressure acting on the mixture of the heat plasticised polymer composition and the foam blowing agent is then progressively reduced so that the dissolved foam blowing agent comes out of solution as a gas to form bubbles in the polymer. The mixture is also cooled and the polymer composition sets to yield a closed-cell polymer foam in which a proportion of the foam blowing agent used in its preparation is entrapped within the cells as a gas. The process of the present invention is preferably an extrusion process in which the foam blowing agent is injected into a stream of the molten polymer composition flowing within the body of an extruder and the resulting mixture is then extruded through a die to produce foam. In a preferred embodiment, the olefinic polymer and polar polymer are conveyed separately to the extruder and are then heated and mixed together within the extruder to form a molten polymer composition which is then contacted with the foam blowing agent. Extrusion processes are well known to those skilled in the art and are routinely used to prepare polystyrene foams.

The olefinic polymer may be a polyethylene or polypropylene homopolymer or copolymer, but is preferably a styrenic homopolymer or copolymer comprising repeating units of at least one styrenic monomer selected from styrene and methyl styrene and optionally repeating units of at least one other ethylenically unsaturated monomer. When the olefinic polymer is a styrenic polymer, preferably at least 50% and more preferably at least 90% (by number) of the repeating units in the polymer are derived from styrene and/or methyl styrene, particularly styrene. In a particularly preferred embodiment, the styrenic polymer is a homopolymer of styrene or methyl styrene, and in an especially preferred embodiment the styrenic polymer is a homopolymer of styrene. Suitable styrenic polymers have an average molecular weight (number average) in the range of from 180000 to 350000, preferably in the range of from 180000 to 250000 and more preferably in the range of from 180000 to 230000, for example about 200000. Advantageously, the present invention can also be used with styrenic polymers which are obtained at least in part from recycled or scrap materials.

The polar auxiliary polymer which is incorporated in the olefinic polymer is preferably a polymer which when in the heat plasticised state is able to dissolve from 2 to 50 times, more preferably from 2 to 20 times the quantity of foam blowing agent as the heat plasticised olefinic polymer on a weight for weight basis. Preferably, the polar auxiliary polymer is an acrylic polymer. The acrylic polymer is suitably a homopolymer or copolymer of at least one acrylic monomer selected from the $C_{1-8}$ alkyl ($C_{1-4}$ alkyl)acrylates, and in a preferred embodiment is a homopolymer or copolymer of at least one acrylic monomer selected from the $C_{1-4}$ alkyl (meth)acrylates. Suitable $C_{1-4}$ alkyl (meth)acrylates include methyl methacrylate, methyl acrylate, ethyl acrylate, propyl acrylate and butyl acrylate. In a particularly preferred embodiment, the acrylic polymer is a homopolymer or copolymer comprising repeating units derived from at least one $C_{1-4}$ alkyl methacrylate, especially methyl methacrylate, and optionally also repeating units derived from at least one $C_{1-4}$ alkyl acrylate, such as methyl acrylate or ethyl acrylate. Preferably from 50 to 100%, more preferably from 80 to 100% and particularly preferably from 90 to 100% (by number) of the repeating units in the acrylic polymer are derived from the at least one $C_{1-4}$ alkyl methacrylate. In an especially preferred embodiment, the acrylic polymer is a homopolymer of methyl methacrylate. The acrylic polymer will typically have an average molecular weight (number average) which is less than 90%, preferably less than 80%, more preferably less than 75% and particularly preferably from 50 to 60% that of the olefinic polymer. Suitably, the acrylic polymer has an average molecular weight (number average) in the range of from 30000 to 180000, preferably in the range of from 50000 to 180000, more preferably in the range of from 50000 to 150000 and especially in the range of from 80000 to 140000. It is also preferred if the acrylic polymer contains less than 5 weight %, in particular less than 2 weight % of residual monomer (based on the weight of the acrylic polymer).

The polymer component of the closed cell polymer foam of the invention typically comprises at least 80%, e.g. from 80 to 99%, by weight of the olefinic polymer(s) and up to 20%, e.g. from 1 to 20%, by weight of the polar auxiliary polymer(s). Preferably, the polymer comprises from 85 to 99% by weight, more preferably from 85 to 95% by weight of the olefinic polymer(s) and from 1 to 15% by weight, more preferably from 5 to 15% by weight of the polar auxiliary polymer(s). A mixture of two or more olefinic polymers and/or two or more polar auxiliary polymers may be contained in the polymer.

Generally, when the olefinic polymer is a styrenic polymer and the polar auxiliary polymer is an acrylic polymer, increasing the proportion of the acrylic polymer within the polymer blend decreases the thermal conductivity of the polymer foam. Typically, a polymer foam prepared from a polymer blend containing about 90% by weight of a styrenic polymer and about 10% by weight of an acrylic polymer will show a reduction in thermal conductivity of about 2 mW. $(mK)^{-1}$ compared with a similar foam prepared from a styrenic polymer alone. The thermal conductivity of the resulting polymer foam is typically from 80 to 97%, preferably from 85 to 97% and particularly from 85 to 90% of a similar foam prepared from the styrenic polymer alone.

This reduction in thermal conductivity may be retained even after several months during which time conventional styrenic foams would show an increase in thermal conductivity due to the diffusion of air into and blowing agent out of the foam.

Suitable hydrofluorocarbons for use in preparing the polymer foam of the present invention may be selected from the $C_{1-4}$ hydrofluoroalkanes, with the hydrofluoromethanes and the hydrofluoroethanes and particularly difluoromethane (hereinafter R-32), 1,1-difluoroethane (hereinafter R-152a), 1,1,1-trifluoroethane (hereinafter R-143a), 1,1,1,2-tetrafluoroethane (hereinafter R-134a), 1,1,2,2-tetrafluoroethane (hereinafter R-134) and pentafluoroethane (hereinafter R-125) being preferred. In a particularly preferred embodiment, the foam blowing agent which is used to prepare the polymer foam of the present invention comprises R-134a and at least one compound selected from the group consisting of carbon dioxide, dimethyl ether and R-152a. Especially preferred foam blowing agents comprise R-134a and at least one of carbon dioxide and R-152a.

The precise composition of the foam blowing agent used in the preparation of the present polymer foam will depend, at least in part, on the composition of the polymer and the desired thermal conductivity of the polymer foam. For blowing agents comprising mixtures of compounds, an indication of the likely thermal conductivity of the mixture can be obtained from the pure component properties by molar mixing. For foam blowing agents comprising R-134a and at least one compound selected from carbon dioxide, dimethyl ether and R-152a, the greatest degree of thermal insulation will generally be obtained when the foam blowing agent comprises from 60 to 95 mole %, preferably from 70 to 95 mole % and more preferably from 80 to 95 mole % of the R-134a and from 5 to 40 mole %, more preferably from 5 to 30 mole % and particularly preferably from 5 to 20 mole % of the carbon dioxide, dimethyl ether and/or R-152a.

The quantity of blowing agent used in the preparation of the present polymer foam will also depend, at least in part, on the composition of the polymer and the desired thermal conductivity and density of the foamed article. Typical levels range from 1 to 20 kg, e.g. 2 to 20 kg, of blowing agent per 100 kg of polymer.

As explained previously, a proportion of the foam blowing agent which is used in the preparation of the closed-cell polymer foam of the present invention is entrapped within the cells of the foam as a gas. Typically, the polymer foam of the present invention will comprise from 1 to 20 weight %, preferably from 2 to 20 weight % and particularly preferably from 2 to 15 weight % of the foam blowing agent based on the total weight of the foam including the blowing agent.

The foam has a closed-cell structure. Typically, the closed cells have sides in the range of from 100 to 1000$\mu$, particularly in the range of from 100 to 900$\mu$ and especially in the range of from 100 to 600$\mu$.

The polymer foam of the invention may contain additives of the type that are conventionally found in polymer foams derived from olefinic polymers such as surfactants, nucleating agents and lubricants.

The polymer foam of the invention may be used to prepare foamed articles and may be laminated onto any suitable support material, e.g. plasterboard, wood or another plastics material, in order to form an insulated building material and the like.

The present invention is now illustrated but not limited with reference to the following examples all of which relate to the blowing of a polymer composition comprising a blend of polystyrene and poly(methyl methacrylate).

EXAMPLES 1 TO 5

A polymer composition comprising 89.5 weight % of a polystyrene polymer having a melt flow index of 3.0 (Huntsman (TM) 212) and 10.5 weight % of a poly(methyl methacrylate) polymer having a melt flow index of 1.0 (Elvacon (TM) 10071 available from Imperial Chemical Industries PLC) was blown into a polymer foam using a Berstorff Schaumex single-screw extruder having a diameter of 90 mm and a blowing agent comprising an 85:15 mixture on a weight basis of R-134a and R-152a.

The polystyrene and poly(methyl methacrylate) polymers were charged to the extruder and were blended together and heat plasticised/melted in the first half of the extruder which was electrically heated. The blowing agent was injected under pressure into the molten polymer composition flowing through the extruder at the mid point of the extruder and the resulting polymer composition/blowing agent mixture was then pumped through the second half of the extruder where it was thoroughly mixed and cooled from a temperature of around 200° C. to a temperature of around 140° C. Finally, the mixture was extruded through a heated die to produce a foam tube which was then compressed flat. Details of the process conditions and the properties of the final polymer foam are recorded in Table 1.

EXAMPLES 6 TO 12

A polymer composition comprising 89.5 weight % of a polystyrene polymer having a melt flow index of 3.0 (Huntsman (TM) 212) and 10.5 weight % of a poly(methyl methacrylate) polymer having a melt flow index of 1.0 (Elvacon (TM) 10071 available from Imperial Chemical Industries PLC) was blown into a polymer foam using a Berstorff Schaumex single-screw extruder having a diameter of 90 mm and a blowing agent comprising a blend of carbon dioxide and an 85:15 mixture on a weight basis of R-134a and R-152a.

The polystyrene and poly(methyl methacrylate) polymers were charged to the extruder and were blended together and heat plasticised/melted in the first half of the extruder which was electrically heated. The blowing agent was injected under pressure into the molten polymer composition flowing through the extruder at the mid point of the extruder and the resulting polymer composition/blowing agent mixture was then pumped through the second half of the extruder where it was thoroughly mixed and cooled from a temperature of around 200° C. to a temperature of around 140° C. Finally, the mixture was extruded through a heated die to produce a foam tube which was then compressed flat. Details of the process conditions and the properties of the final polymer foam are recorded in Table 1.

EXAMPLES 13 TO 24

A polymer composition comprising 89.5 weight % of a polystyrene polymer having a melt flow index of 3.0 (Huntsman (TM) 212) and 10.5 weight % of a poly(methyl methacrylate) polymer having a melt flow index of 1.0 (Elvacon (TM) 10071 available from Imperial Chemical Industries PLC) was blown into a polymer foam using a Berstorff Schaumex single-screw extruder having a diameter of 90 mm and a blowing agent comprising a mixture of R-134a and carbon dioxide.

The polystyrene and poly(methyl methacrylate) polymers were charged to the extruder and were blended together and heat plasticised/melted in the first half of the extruder which was electrically heated. The blowing agent was injected under pressure into the molten polymer composition flowing through the extruder at the mid point of the extruder and the resulting polymer composition/blowing agent mixture was then pumped through the second half of the extruder where it was thoroughly mixed and cooled from a temperature of around 200° C. to a temperature of around 140° C. Finally, the mixture was extruded through a heated die to produce a foam tube which was then compressed flat. Details of the process conditions and the properties of the final polymer foam are recorded in Table 1.

TABLE 1

| Example | A | B | C | D | E | F | G | H |
|---|---|---|---|---|---|---|---|---|
| 1 | 65.7 | 0 | 4.5 | 0 | 6.8 | 153 | | 107 |
| 2 | 67 | 0 | 5.8 | 0 | 8.7 | | | 116 |
| 3 | 68.6 | 0 | 7.4 | 0 | 10.8 | 154 | 143 | 67 |
| 4 | 81 | 0 | 9 | 0 | 11.1 | 139 | 142 | 56 |
| 5 | 80.5 | 0 | 8.5 | 0 | 10.6 | 141 | 141 | 68 |
| 6 | 79.5 | 400 | 6.5 | 1.3 | 8.2 | 139 | 120 | 48 |
| 7 | 78 | 400 | 5 | 1.3 | 6.4 | 149 | 134 | 63 |
| 8 | 78.5 | 600 | 5 | 1.9 | 6.4 | 147 | 126 | 59 |
| 9 | 79 | 800 | 5 | 2.5 | 6.3 | 141 | 127 | 52 |
| 10 | 79.5 | 1000 | 5 | 3.1 | 6.3 | 138 | 129 | 51 |
| 11 | 78.1 | 1000 | 3.6 | 3.2 | 4.6 | 144 | 124 | 55 |
| 12 | 76.9 | 1000 | 2.4 | 3.3 | 3.1 | 146 | 123 | 57 |
| 13 | 75.5 | 200 | 3 | 0.7 | 4 | 159 | 151 | 211 |
| 14 | 75.8 | 333 | 3 | 1.1 | 4 | 157 | 145 | 157 |
| 15 | 77.6 | 333 | 4.8 | 1.1 | 6.2 | 154 | 143 | 95 |
| 16 | 78.8 | 333 | 6 | 1.1 | 7.6 | 150 | 140 | 85 |
| 17 | 79.7 | 666 | 6 | 2.1 | 7.5 | 150 | 136 | 76 |
| 18 | 81.7 | 666 | 8 | 2 | 9.8 | 150 | 136 | 54 |
| 19 | 80.7 | 666 | 7 | 2.1 | 8.7 | 150 | 134 | 54 |
| 20 | 77.5 | 666 | 3.8 | 2.1 | 4.9 | 151 | 137 | 89 |
| 21 | 77.5 | 666 | 4.8 | 2.1 | 4.9 | 144 | 125 | 58 |
| 22 | 79.3 | 1000 | 4.8 | 3.2 | 6.1 | 142 | 144 | 53 |
| 23 | 80.5 | 1000 | 6 | 3.1 | 7.5 | 147 | 134 | 53 |
| 24 | 77.2 | 1000 | 2.7 | 3.2 | 3.5 | 149 | 130 | 78 |

A = Polymer feed rate (kg/hour)
B = Carbon dioxide feed rate (liters/hour)
C = Rate of feed of 134a or 134a/152a blend (kg/hour)
D = Weight % of carbon dioxide in final foam
E = Weight % of 134a or 134a/152a blend in final foam
F = Temperature at die inlet (° C.)
G = Pressure at die inlet (bar)
H = Density of final foam (g/liter)

What is claimed is:

1. A closed-cell polymer foam having a density of less than 100 kg.m$^{-3}$ in which the cells contain a foam blowing agent comprising:
   a blend of carbon dioxide and one or more hydrofluorocarbons, and the polymer is a blend comprising at least 50% by weight of an olefinic polymer(s) and up to 50% by weight of a polar polymer(s) having a lower molecular weight than the olefinic polymer which when in the heat plasticised state is able to dissolve the foam blowing agent.

2. A closed-cell polymer foam as claimed in claim 1 having a density in the range of from 20 to 80 kg.m$^{-3}$.

3. A closed-cell polymer foam as claimed in claim 1 or claim 2 wherein the olefinic polymer is a styrenic homopolymer or copolymer comprising repeating units of at least one styrenic monomer selected from styrene and methyl styrene and optionally repeating units of at least one other ethylenically unsaturated monomer.

4. A closed-cell polymer foam as claimed in claim 3 wherein the styrenic polymer is a homopolymer of styrene.

5. A closed-cell polymer foam as claimed in claim 3 or claim 4 wherein the styrenic polymer has an average molecular weight (number average) in the range of from 180000 to 350000.

6. A closed-cell polymer foam as claimed in claim 5 wherein the styrenic polymer has an average molecular weight (number average) in the range of from 180000 to 250000.

7. A closed-cell polymer foam as claimed in claim 1 wherein the polar polymer is a polymer which when in the heat plasticised state is able to dissolve from 2 to 50 times the quantity of foam blowing agent as the heat plasticised olefinic polymer on a weight for weight basis.

8. A closed-cell polymer foam as claimed in claim 1 wherein the polar polymer is an acrylic polymer.

9. A closed-cell polymer foam as claimed in claim 8 wherein the acrylic polymer is a homopolymer or copolymer comprising repeating units derived from at least one $C_{1-4}$ alkyl methacrylate and optionally repeating units derived from at least one $C_{1-4}$ alkyl acrylate.

10. A closed-cell polymer foam as claimed in claim 9 wherein the acrylic polymer is a homopolymer of methyl methacrylate.

11. A closed-cell polymer foam as claimed in claim 8 wherein the acrylic polymer has an average molecular weight (number average) which is less than 90% that of the olefinic polymer.

12. A closed-cell polymer foam as claimed in claim 8 wherein the acrylic polymer has an average molecular weight (number average) in the range of from 30000 to 180000.

13. A closed-cell polymer foam as claimed in 12 wherein the acrylic polymer has an average molecular weight (number average) in the range of from 50000 to 180000.

14. A closed-cell polymer foam as claimed in claim 1 wherein the polymer component comprises from 80 to 99% by weight of the olefinic polymer(s) and from 1 to 20% by weight of the polar polymer(s).

15. A closed-cell polymer foam as claimed in any one of the preceding claims wherein the foam blowing agent comprises 1,1,1,2-tetrafluoroethane (R-134a) carbon dioxide dimethyl ether and 1,1-difluoroethane (R-152a).

16. A closed-cell polymer foam as claimed in claim 1 which comprises from 1 to 20 weight % of the foam blowing agent based on the total weight of the foam including the blowing agent.

17. A closed-cell polymer foam a claimed in claim 1 wherein the polymer is a thermoplastic polymer.

18. A process for preparing a closed-cell polymer foam as claimed in claim 1 which process comprises blowing a heat plasticised polymer composition with a foam blowing agent comprising:
   a blend of carbon dioxide and one or more hydrofluorocarbons, the said polymer composition comprising at least 50% by weight of an olefinic polymer(s) and up to 50% by weight of a polar polymer (s) having a lower molecular weight than the olefinic polymer which when in the heat plasticised state is able to dissolve the foam blowing agent.

19. A process as claimed in claim 18 wherein the foam blowing agent is injected into the heat plasticised polymer composition.

20. A process as claimed in claim 18 or claim 19 wherein the heat plasticised polymer composition is contacted with the foam blowing agent at a temperature in the range of from 100 to 300° C. and a pressure in the range of from 20 to 200 bar.

21. A process as claimed in claim 20 wherein the heat plasticised polymer composition is contacted with the foam blowing agent at a temperature in the range of from 120 to 300° C. and a pressure in the range of from 50 to 200 bar.

22. A process as claimed in claim 18 wherein the polymer composition is in the molten state and the foam blowing agent is injected into a stream of the molten polymer composition flowing within the body of an extruder to form a mixture which is then extruded through a die to produce the foam.

23. A process as claimed in claim 22 wherein the olefinic polymer and polar polymer are conveyed separately to the extruder and are then heated and mixed together within the extruder to form the molten polymer composition.

* * * * *